United States Patent [19]
Horsch

[11] 4,157,750
[45] Jun. 12, 1979

[54] LUBRICANT COOLED FRICTION CLUTCH WITH TWO RATES OF FLOW

[75] Inventor: Joachim Horsch, Lombard, Ill.

[73] Assignee: International Harvester Company, Chicago, Ill.

[21] Appl. No.: 796,105

[22] Filed: May 12, 1977

Related U.S. Application Data

[60] Continuation of Ser. No. 599,801, Jul. 28, 1975, abandoned, which is a division of Ser. No. 471,539, May 20, 1974, Pat. No. 3,913,616.

[51] Int. Cl.$^2$ .............................................. F16D 13/72
[52] U.S. Cl. ............................... 192/113 B; 192/87.17
[58] Field of Search ................... 192/113 B, 86, 106 F; 188/264 E

[56] References Cited

U.S. PATENT DOCUMENTS

| | | | |
|---|---|---|---|
| 3,059,746 | 10/1962 | Christenson | 192/113 B |
| 3,080,774 | 3/1963 | Nickerson | 192/113 B |
| 3,105,582 | 10/1963 | Ziabicki | 192/113 B |
| 3,300,004 | 1/1967 | Peterson | 192/113 B |
| 3,410,375 | 11/1968 | Schmidt | 192/113 B |
| 3,823,802 | 7/1974 | Winzeler et al. | 192/113 B |

*Primary Examiner*—Benjamin W. Wyche
*Attorney, Agent, or Firm*—John W. Gaines; Ronald C. Kamp; F. David AuBuchon

[57] ABSTRACT

Transmission having a number of lubricant cooled friction engaging means, a majority of which at any time are nonselected for operation, and further having flow blocking sleeves individual to the friction engaging means, each providing a friction coupling in the power path for shift purposes. Valve means is provided therein to direct coolant flow at lo rate to each friction coupling when such coupling is not engaged, and to increase flow to hi rate thereto when it is engaged.

9 Claims, 9 Drawing Figures

LUBRICANT COOLED FRICTION CLUTCH WITH TWO RATES OF FLOW

This application is a continuation of abandoned application Ser. No. 599,801 filed July 28, 1975, which was divided from Ser. No. 471,539 filed May 20, 1974, now U.S. Pat. No. 3,913,616.

This application relates to lubricant cooled friction engaging means, particularly fluid clutches and brakes each controlled so as to have two rates of cooling flow. Background patents include but are not limited to Krawczyk et al. U.S. Pat. No. 3,425,293.

It is a known practice that fluid flow and fluid pressure control is afforded to friction engaging means, e.g., a fluid clutch or fluid brake, by means of a single system. According to the practice, the fluid at the point it is being applied as hydraulic pressure to cause the friction engaging means to be operated or not is likewise used at or near the application point to provide hydraulic cooling flow to the same friction engaging means. The difference is the hydraulic operating pressure at that point is kept at line pressure whereas, where used for cooling at that point, it must be bled down to a pressure low but adequate for cooling flow. Heat from frictional engagement and disengagement can raise temperatures excessively high when there is no provision in the system for cooling.

The change in pressure in such a single system presents a problem. That is to say, cooling and clutch actuation occur only alternately. Otherwise, production of cooling flow while the friction means is engaged will cause available line pressure to bleed down, because the large or small proportion of flow allocated to cooling will inherently produce a large or small drop in line pressure. Continuously maintaining cooling flow at a steady rate is used as one attack on the problem mentioned, but doing so introduces drawbacks in the single system and other systems, particularly such a system involving a number of friction engaging means therein.

My invention in its provision of two rates of cooling flow to each of a number of friction engaging means, materially reduces or substantially eliminates the foregoing problem; in the transition to the higher rate, the comparatively drastically multiplied open-valve flow area exposed with the very first increment of shift movement herein makes the outset of clutch flooding almost instantaneous, affording a real head start in the cooling process in contrast to comparable prior art two-rate systems, all as will now be explained in detail. Features, objects, and advantages will either be specifically pointed out or become apparent when, for a better understanding of the invention, reference is made to the following description taken in conjunction with the accompanying drawings, which show a preferred embodiment thereof and in which:

FIG. 4 is a diagram showing how FIGS. 1, 2, and 3 are combined to show all portions of the transmission;

Figure 9:
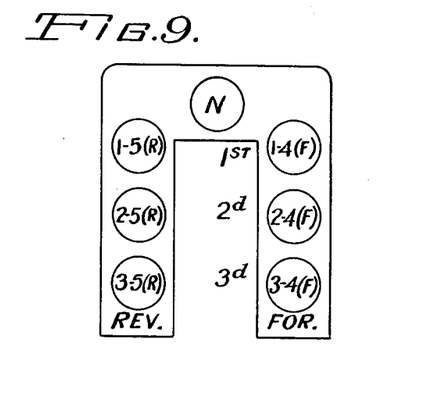
FIG. 9 shows the shift pattern for the transmission system of FIG. 8 as neutralized, and as shifted to three forward and reverse speeds wherein the numbers within the circles designating shift positions refer to the transmission clutches engaged for the desired direction and ratio in the two speed ranges.

In FIGS. 1, 2, 3, and 5, a countershaft power shift transmission is shown effective for transmitting torque in various forward speed range and reverse speed range ratios dependent upon which friction engaging device in each of two sets is selectively engaged. The numerals 1, 2, 3, 4, and 5 refer to disk clutches in the respective devices whereby it is possible by the shift pattern of FIG. 9 to determine which clutches are so selected for engagement. Specifically, clutches 1, 2, and 3 form a set of speed ratio or range clutches for the vehicle carrying the transmission system, and clutches 4 and 5 are in another set known as direction clutches in which the forward (F) clutch 4 conditions the transmission for forward drive of the vehicle and the reverse (R) clutch 5 is for reverse. Each gear ratio and direction is established by a direction clutch and speed clutch being engaged and, unless one clutch from each set is engaged, power will not be transmitted through the transmission. These speed clutches are technically the load clutch set because the selected one is conditioned to be engaged after the selected direction clutch and thus operates to pick up the load. The transmission will now be more fully explained.

Figure 1:
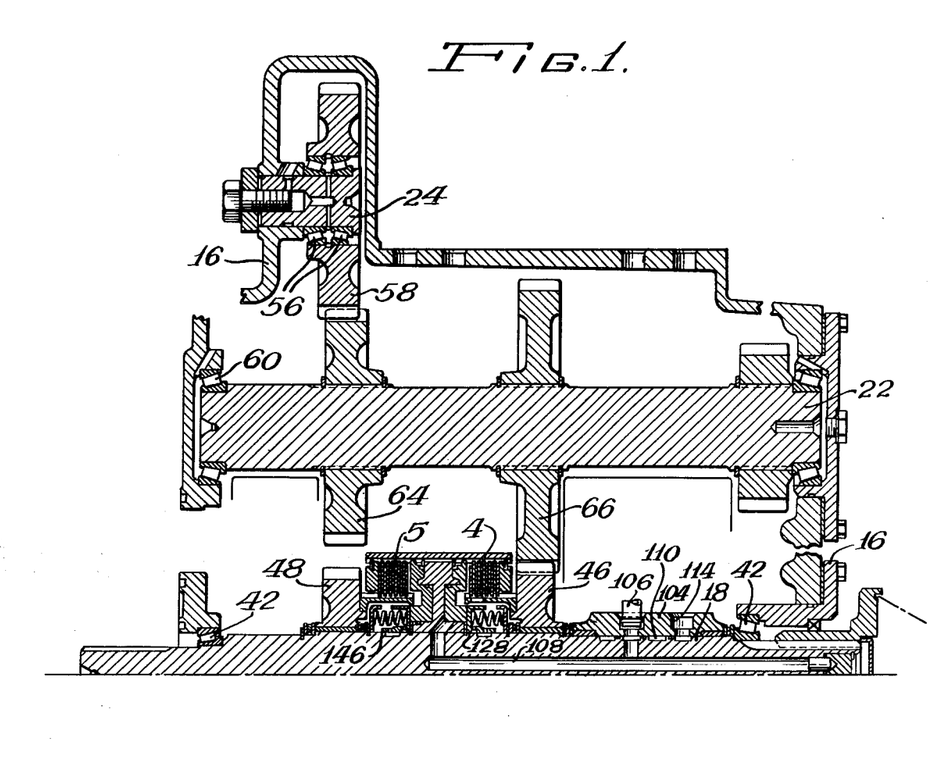
FIGS. 1, 2, and 3 are developed longitudinal elevational views of the respective upper rear, lower rear, and front portions of a vehicle transmission embodying the present invention.
Figure 2:
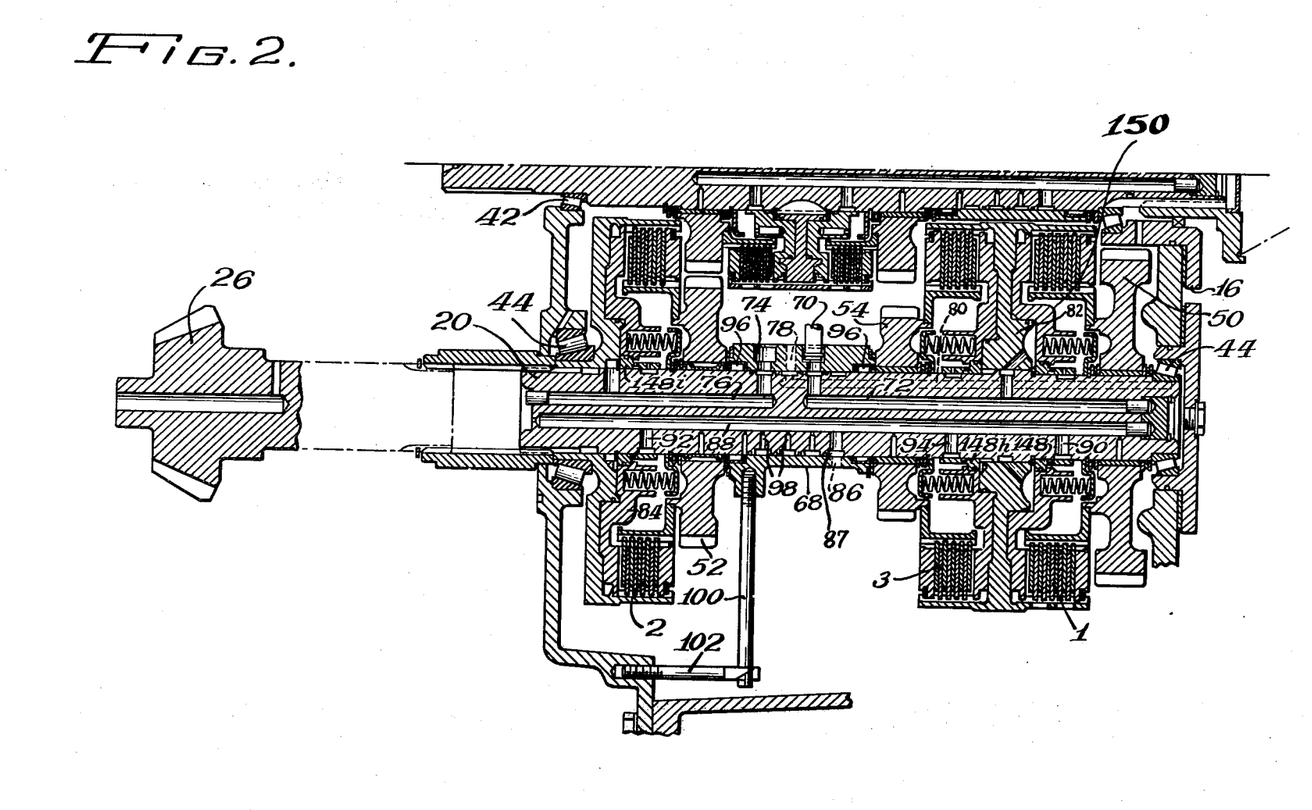
Figure 3:
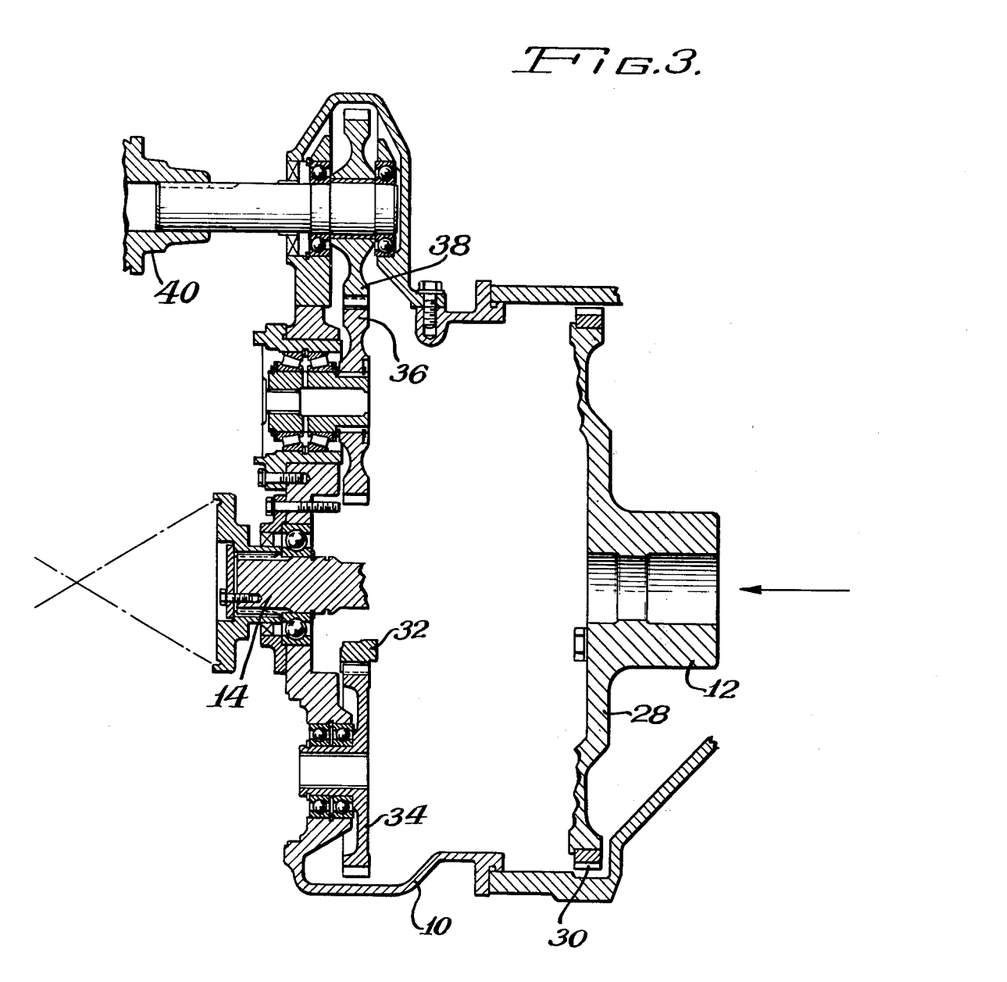
Figure 4:
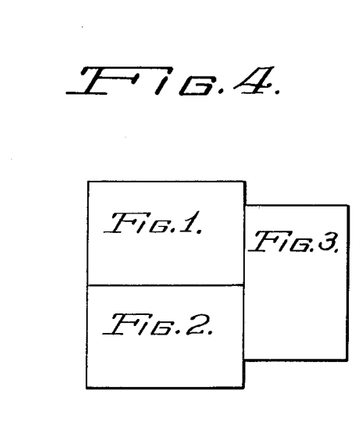

The transmission as shown comprises: a front housing 10 for a coupling device, not shown, including an engine connected shaft 12 by which the vehicle engine, not shown, applies power to the transmission, and a coupling shaft 14 carrying a universal joint U; a transmission case 16 comprising an input shaft 18 connected to the universal joint U carried by the coupling shaft, a longitudinally passaged output shaft 20 defining with the input shaft a vertical reference plane, a countershaft 22, the center line of which is on the side of the vertical reference plane away from the viewer and is at a level at the actual center line position indicated, and a reverse idler shaft 24, the center line of which in actuality is on the side of the vertical reference plane away from the viewer and is at a level at the actual position indicated; and a vehicle steering and final drive including a bevel pinion 26 connected to the output shaft 20 for delivering the transmission power in order to drive the vehicle, which for example can be a crawler tractor, not shown.

HOUSING FOR COUPLING—FIG. 3

Within the front housing 10, the engine connected shaft 12 carries an engine flywheel 28 provided at its periphery with a ring of starter gear teeth 30. By suitable connections thereto, the coupling device, not shown, interconnects the flywheel 28 and the coupling shaft 14 and, in addition, carries a partially shown pump drive pinion 32. The drive pinion 32 is directly connected to a lower pump gear 34, and is indirectly connected through a reverse idler 36 to an upper pump gear 38. The gears 34 and 38 individually drive components such as the upper component 40 which is a transmission pump.

Figure 5:
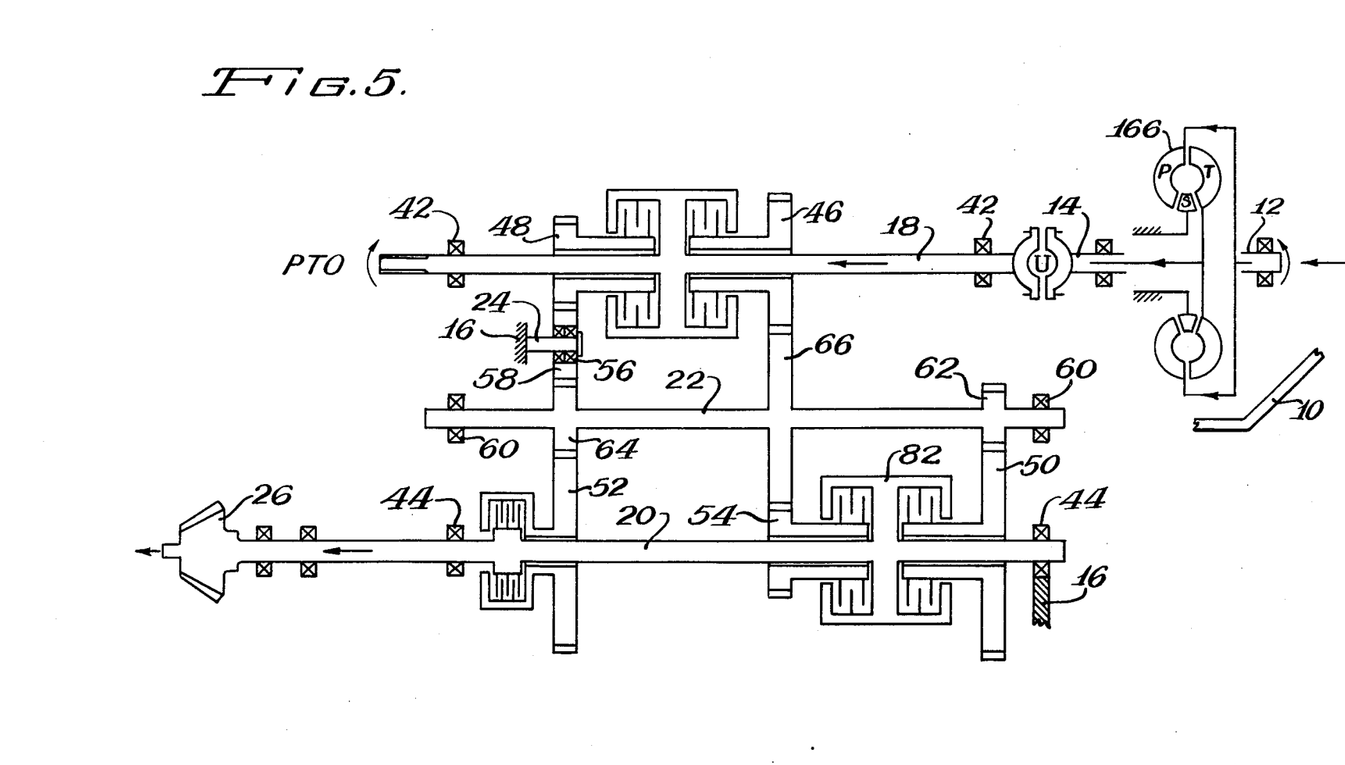
FIG. 5 is a simplified schematic view of the transmission, complete with a coupling device in the input and depicting the meshing operation more fundamentally.

TRANSMISSION CASE—FIGS. 1, 2, AND 5

In the transmission case 16, a span of bearings 42 journals the input shaft 18 for rotation on its axis which is contained in the earlier referred to vertical reference plane, and a span of bearings 44 journals the output shaft 20 for rotation on its axis likewise contained in the vertical reference plane. A forward gear 46 and a reverse gear 48, relatively rotatably mounted on the input shaft 18, are controlled by the respective forward (F) clutch 4 and reverse (R) clutch 5 for rotation conjointly with or independently of the input shaft 18. A first gear 50, a second gear 52, and a third gear 54, relatively rotatably mounted on the output shaft 20 are controlled by the respective low speed clutch 1, medium speed clutch 2, and high speed clutch 3 for rotation of no more than one clutch conjointly with the output shaft and the rotation of the others independently of the output shaft.

A span of bearings 56 journals an idler gear 58 for rotation on the reverse idler shaft 24 which is fixed to the transmission case 16.

In the case 16, a span of bearings 60 journals the countershaft 22 which carries and jointly rotates with a low gear 62, an intermediate gear 64, and a high gear 66. It is the latter gear 66 by which the input shaft establishes all power paths to the output shaft 20 in the forward range of speeds.

Specifically, power for high speed forward is transmitted in a direct path from the input shaft forward gear 46, through the intermeshing high gear 66 and third gear 54, through the load clutch 3 as it engages, thence through the output shaft 20 to the power delivering bevel pinion 26. Somewhat similarly, the power path for low speed is from the forward gear 46, through the gear 66 and low gear 62, through the first gear 50 and load clutch 1 as it engages, thence through the output shaft 20 to the pinion 26. For intermediate forward speed, power is transmitted from the forward gear 46, through the gears 66 and 52, through the load clutch 2 as it engages, thence through the output shaft 20 to pinion 26.

It is the power path through the idler gear 58 and intermediate gear 64 by which the reverse clutch 5 transmits the reverse range from the input shaft 18 to the output shaft. Specifically for intermediate speed, the power path is from the gears 48, 58, and 64, through the second gear 52 and load clutch 2 as it engages, thence through the output shaft 20 and pinion 26. High speed reverse power flow is from the same gears 48, 58, and 64, through the gears 66 and 54, through the load clutch 3 as it engages, thence into the output shaft and pinion 26. Finally, for low speed reverse, power flows from the gears 48, 58, and 64, through the gears 62 and 50 and load clutch 1 as it engages, thence into the output shaft 20 and pinion 26.

FLOATING MANIFOLDS—FIG. 2

The output shaft 20 at its intermediate section supports and is relatively rotatable within a floating manifold 68. The manifold is a sleeve which interconnects a first fluid line 70 and a shaft passage 72 included therein, interconnects a second fluid line 74 and a shaft passage 76 included in the line, and interconnects a third fluid line 78 and a shaft passage 80 included therein. The shaft passages 72 and 80 provide separate connections between the opposite sides of a reaction member 82 between the clutches 1 and 3 for applying hydraulic pressure selectively to operate the two clutches. The shaft passage 76 in the second fluid line provides a connection to a piston 84 for the intermediate clutch 2 for applying hydraulic pressure to operate the latter.

The manifold 68 also interconnects a lube line 86 leading to a groove 87 and a longitudinal shaft passage 88 providing separate first, second, and third connections 90, 92, and 94 to clutches 1, 2, and 3 in order to introduce the flow of cooling fluid thereto.

By means of needle bearings 96 at its ends, the cylindrical manifold 68 centers itself on the midsection of the output shaft 20 and can constantly adjust in position so that by proper shifting with the shaft it readily accommodates to shaft deflections. Seals which are shown between the respective rows of needle elements in the needle bearings and between the shaft and manifold 68 keep hydraulic fluid in the lines separate and are constantly lubricated through restricted passages 98 in the shaft leading from the longitudinal shaft passage 88 for lubricant.

The manifold 68 is held against rotation with the shaft by means of a radial rod 100 carried by the manifold and keyed at its outer end in a longitudinally extending fork 102 which is anchored to the case 16. The sleeve manifold is thus afforded freedom to move in two degrees, i.e., with radial sleeve adjustment slightly toward and away from the plane of the fork 102 as the rod reciprocates therein, and with slight longitudinal adjustment of the sleeve parallel to the output shaft and to the fork 102. The connection never allows the rod to revolve, and it shifts in the fork by sliding.

Similarly, a floating manifold 104 is mounted the same way for the same purpose on an intermediate section of the input shaft 18. The manifold 104 interconnects a forward fluid line 106 and a shaft passage 108 included therein, interconnects a reverse line 110 and a shaft passage 112 included in the reverse line, and interconnects a lube line 114 and a shaft passage 116 included therein for hydraulic cooling flow to the forward and reverse clutches 4 and 5. The shaft passages 108 and 112 provide separate connections through a reaction member 118 between the direction clutches 4 and 5 for applying hydraulic pressure selectively to operate the latter.

The manifolds are comparitively cheap, light, and small sleeves, free from rapid wear and friction drag, and readily staying centered on the supporting shaft for good sealing while the shaft deflects and undeflects. The purpose of the sleeve manifolds is not as any structural member to fix the shaft centerline, but as a dynamic unresisting member staying accurately self centered to accommodate to all shaft deflections.

Figure 6:
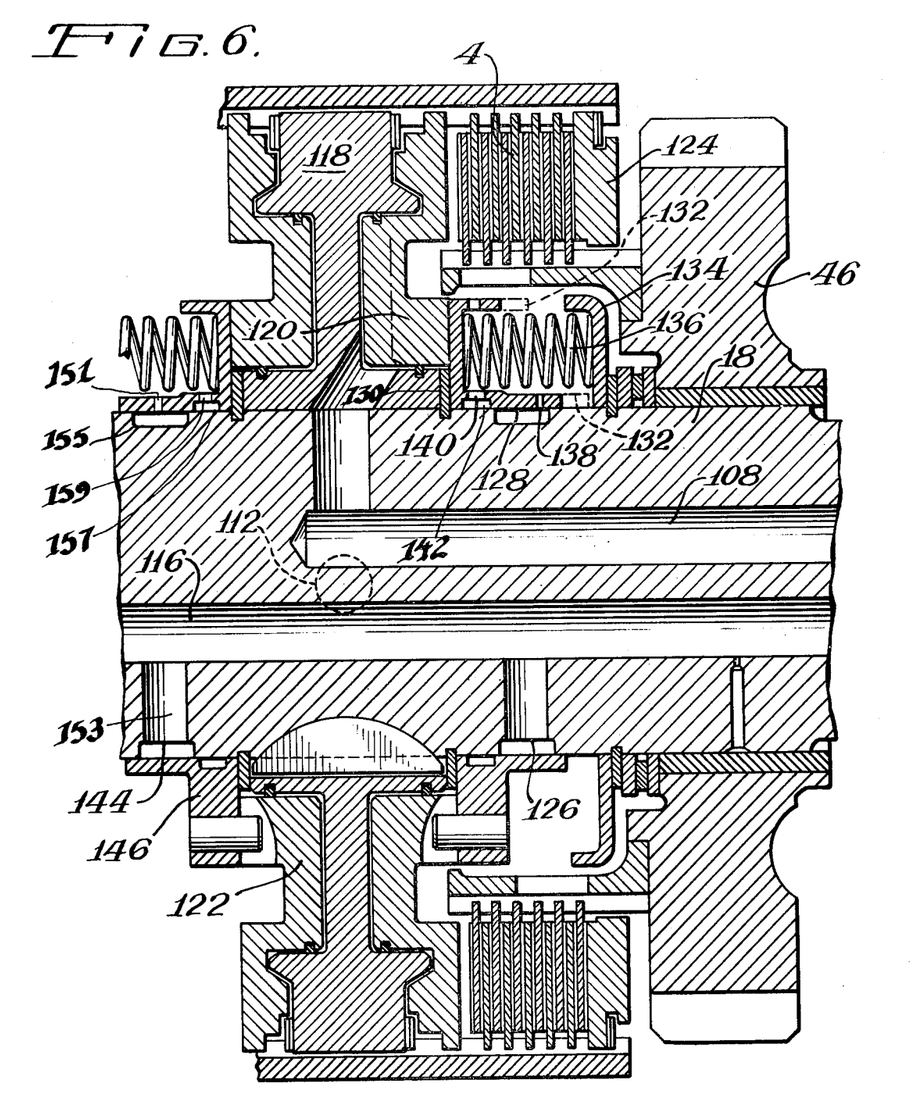
FIGS. 6 and 7 show details of FIG. 1 to an enlarged scale, namely, a direction clutch 4 and a speed clutch 1, respectively.

MULTIRATE FLOW—FIG. 6 TYPE

Annular forward and reverse pistons 120 and 122 are moved by hydraulic pressure in opposite directions from one another out of complementary piston chambers on opposite sides of the just mentioned reaction member 118 between clutches 4 and 5 on the input shaft 18. Axial movement of the pistons compresses the clutch plates against backing members such as the one typified by the forward clutch backing member 124. When engaged by the piston, the forward clutch 4 establishes forward drive from the input shaft 18, through the keyed on reaction member 118 and outer discs of the clutch 4, through the friction engaged inner discs of the clutch 4, thence from inner splines to the forward gear 46 to which the splines are made fast.

The shaft passage 116 terminates in a forward lube passage which radially communicates at its inner end with the passage 116 and at the port in its outer end with a circumferential groove 126 around the input shaft 18. A combined spring seat and shuttling blocking sleeve 128 on the input shaft 18 is in the path of the forward piston 120 so as to be engaged and moved thereby between a position as shown in solid lines against a shaft snap ring 130 and an engaged position as corresponds to the engaged position of the clutch 4 and as shown in broken lines 132 closely adjacent a spring seat 134. The piston 120 and the shuttling sleeve 128 are controlled by hydraulic pressure and by a clutch disengaging return spring 136 which is preloaded between the sleeve 128 and the spring seat 134. In practice, the spring 136 is actually one of a series of sleeve engaging clutch return springs used in conjunction with direct-piston-engaging clutch return springs which act therewith to return piston and sleeve to disengaged position.

Cooling flow is normally at a lo rate in a path from the shaft passage 116, through the radial passage and forward lube port, through the shaft port groove 126, thence through a single restricted sleeve hole 138 to the clutch 4, which thus receives minor surface lubrication and cooling. But in the engaged position of the sleeve as shown by the broken lines 132, hi cooling flow occurs because of the added path afforded by three sleeve holes 140 which communicate with the lube port and circumferential port groove 126 by means of a sleeve groove 142 therebetween.

A reverse lube port and shaft groove 144 and a reverse shuttling blocking sleeve 146 cooperate in the same way with the reverse piston 122, the operation similarly being controlled by hydraulic pressure and by return springs. At least two springs in the set of the return springs also load the sleeve so as to bear lightly against and follow the piston at all times at which the latter is displaced. Correspondingly appearing are the counterpart reverse, single restricted sleeve hole or port 151, radial pressure 153, chamber groove 155, sleeve groove 157, and three sleeve holes 159.

Figure 7:
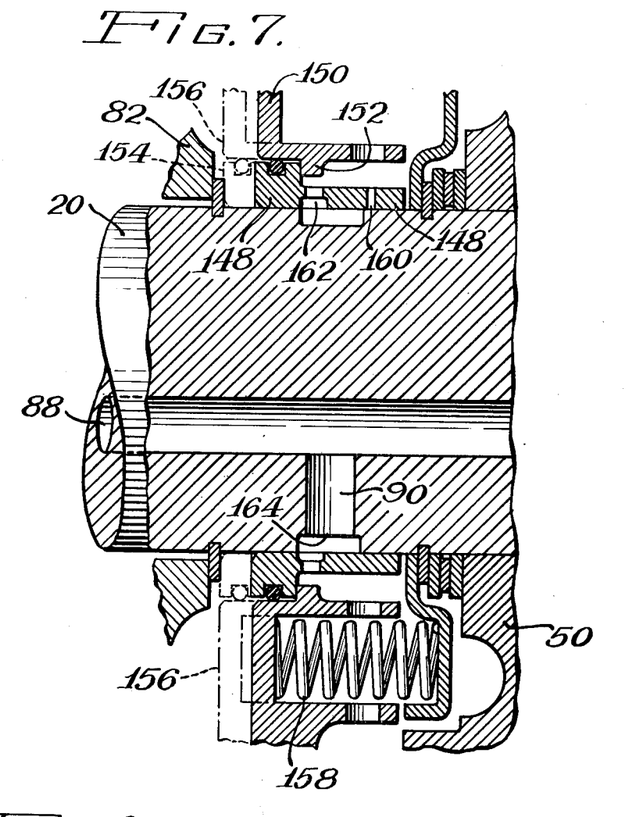

MULTIRATE FLOW—FIG. 7 TYPE

In each of the clutches 1, 2, and 3 on the output shaft 20, I employ a combined piston flange portion and shuttling blocking sleeve as typified by the sleeve 148 included with the clutch 1 on the output shaft. The large diameter of the clutch 1 necessitates a large, low clutch piston 150 therefor, and the sleeve 148 presents clutch flange piston area augmenting the piston area of, and operating in tandem with, the piston 150. An annular rib 152 carried by the piston is in the path of the sleeve 148 so that hydraulic pressure transmitted through the reaction member 82 moves the sleeve and piston from their respective broken line positions 154 and 156 conjointly to engaged position. The sleeve hydraulically adds materially to the clutching force.

The actuated or engaged position is shown in solid lines, where it is seen that the sleeve is in the path of the annular rib 152 so that one spring 158 in a series of clutch return springs acts therewith against the piston 150 to urge the sleeve and piston back into their broken line positions 154, 156. A single restrictive sleeve hole 160 is effective when the sleeve is in the broken line position to communicate lo cooling flow to the clutch 1 when disengaged, in a path leading from the adjacent lube line shaft passage 88, radially through the ported passage 90 in the shaft through a port groove 164 in the shaft 20, thence through a circumferential groove 162 in the sleeve and the hole 160 restrictively to the clutch 1. But when the sleeve is in the solid line position corresponding to clutch engaged position, four sleeve holes seen connected to the periphery of the sleeve groove 162 are effective to provide hi cooling flow.

While the rate of flow is greatly multiplied at the critical time with the change from the hole 160 to the four larger holes fed by the groove 162, the course of flow is the same. That is in the transition to the higher rate, lube oil flows in the cooling path from the shaft passage to the clutch 1 in the way described. More specifically, the outwardly facing shaft groove 164 (126 in FIG. 6) becomes an annular chamber that is valve controlled at its outlet by a sleeve valve part which, in a valve-open position, frees the groove at the outlet so as to distribute its discharge over the entire groove circumference.

In both type embodiments foregoing, the shuttle sleeves will be seen to be operable automatically attendant with movement of the friction engaging means concerned. In the FIG. 6 type sleeve 128, the movement has to be attendant with physical movement of the friction engaging means because the sleeve is mechanically in the path of the piston 120. And the fact in point in the FIG. 7 type sleeve 148 is the sleeve cannot move unless and until the piston 150 moves thereahead, affording a breaking of the valving seal from its initial ring of substantially continuous sealing engagement circumscribing the clutch shaft.

COUPLING—FIG. 5

The cooling illustrated within the housing 10 is a commercially available torque converter 166, having toric blading forming respectively a pump P, a turbine T, and a stator S. The converter affords an infinitely variable ratio in the transmission up to low speed forward and up to low speed in reverse. Thereafter, a change speed power shift in the transmission will cause the vehicle to proceed at intermediate speed forward or reverse, and finally at high speed in forward or reverse. Also the converter allows the transmission to give the vehicle a smooth start up directly in the intermediate setting and directly in the high setting.

Figure 8:
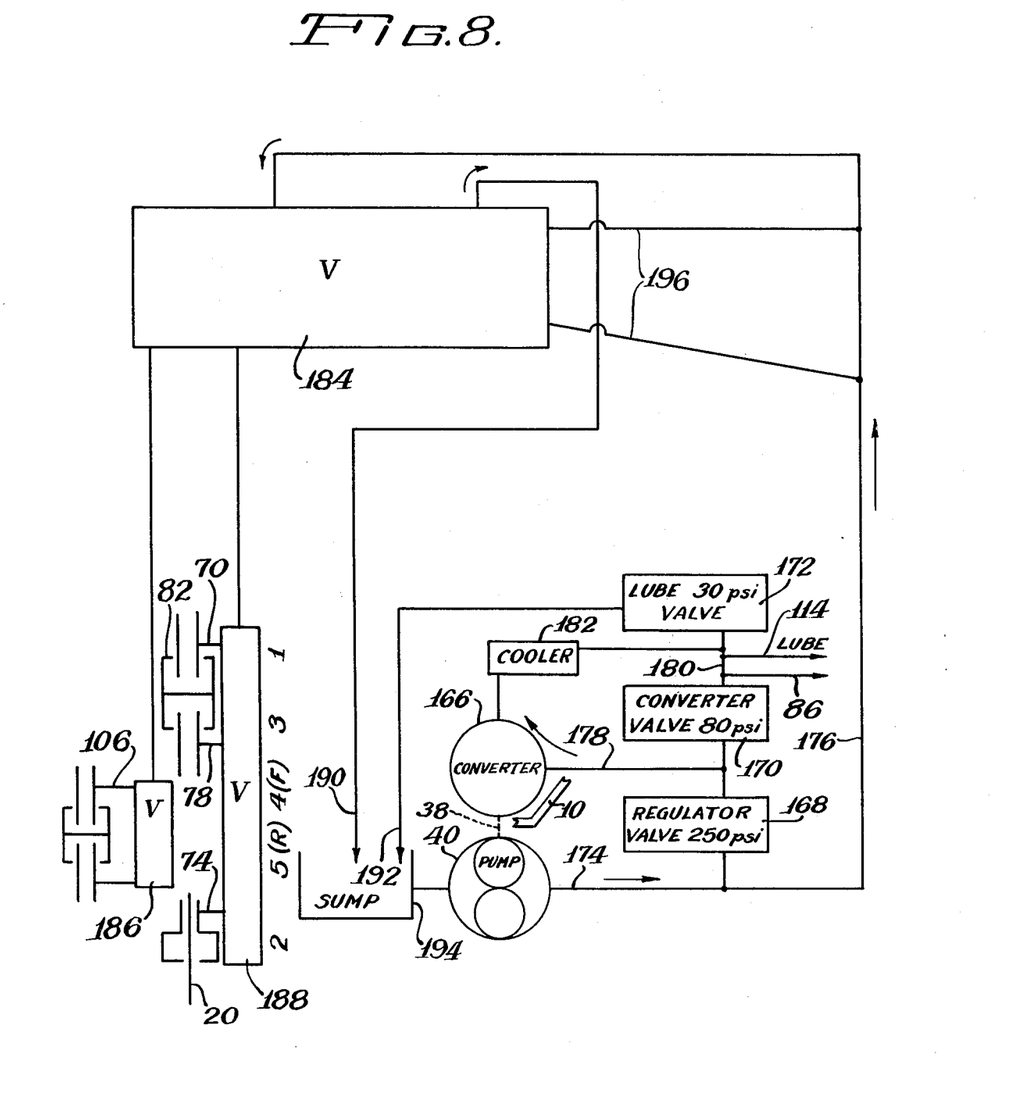
FIG. 8 schematically shows the transmission of FIG. 7 with certain parts omitted and with the hydraulic control system added.

PUMP CONNECTIONS—FIG. 8

The previously referred to upper component is a pump component 40 driven from the torque converter 166 by the so-called upper pump gear 38. A regulator valve stack hydraulically connected to the pump outlet 174 comprises high, intermediate, and low regulator valves 168, 170, and 172 by which the pump 40 supplies 250 psi engaging pressure oil to a line pressure line 176, 80 psi. oil to a converter pressure line 178, and 30 psi. oil through a lube manifold 180. Flow in the lube manifold line 180 is augmented by the flow leaving a converter cooler 182 which maintains back pressure in usual way on the converter 166.

Oil in the line pressure line 176 leading from the pump is directed by a sequencing value 184 first to a manual direction valve 186 for engaging the direction clutch selected and second to a manual speed valve 188 for engaging a selected load clutch. Details of the sequencing valve 184 by which it is afforded automatic operation are separately disclosed and claimed in a copending Horsch patent application owned by the same assignee.

A sequencing valve drain 190 and a lube drain 192 from the low regulator valve 172 in the regulator stack are connected to a sump 194 which supplies the pump 40. Reference pressure taps 196 from the line pressure line 176 are connected to the sequencing valve 184. Other parts identified by reference numerals in FIG. 8 will be recognized from the preceding description.

From the foregoing, it will be appreciated that fluid pressure control exerted by the sequencing value 184 for dual operation at the right time of the direction and load clutches respectively, is not interfered with by the fluid flow control in its dual operation. That is to say, fluid flow control maintained by the individual shuttling blocking sleeves for dual operation, at the right time, of directed lo cooling flow and unblocked hi cooling flow to each clutch does not interfere with the pressure level at sequencing valve 184 in its dual operation. The respective circuits and the respective three stages of pressure thereof are kept separate by the high, intermediate, and low regulator valves 168, 170, and 172.

Effective at the optimum time therefor, the restricted lube oil has a low flow rate, established by the blocking sleeves when the clutch discs are disengaged, to slightly wet and prevent such discs from dragging against one another in dry state. Effective at the optimum time therefor, the lube oil is unblocked by the sleeves for hi cooling flow to the clutch discs while at and to and from their engaged position. By being so flooded with cooling oil, the clutch discs as they unavoidably slip under load in engaging and disengaging are cooled with adequate liquid. So on the one hand they are not overheated and they are not overheated when engaged after stopping all slippage, while on the other hand at the same time the plurality of disengaged clutches consumes a minimal amount and requires a minimal amount of the lube oil. Precisely as desired, the nonselected clutches avoid any appreciable waste of fluid flow, needed by the selected clutches or clutch, because of the sleeves, and such fluid flow is prevented from wasting or dropping down the line fluid pressure because the fluid flow and fluid pressure control circuits are separate.

That is to say, when the blocking sleeve 128 or 146 for one selected direction clutch 4 or 5 is directing coolant to the selected clutch during its engagement, the blocking sleeve for the other direction clutch is blocking same to conserve the consumption of lube oil flow, all the while that the shuttling blocking sleeve 148 on the output shaft 20 and an intermediate clutch blocking sleeve 148i and a high clutch blocking sleeve 148h are likewise conserving lube oil in the shaft 20. Subsequently when the associated one of the sleeves 148, 148i, and 148h moves into the unblocking position to flood the selected load clutch 1, 2 or 3, the other two of the three sleeves 148, 148i, and 148h on the output shaft 20 conserve flow in their blocking position; likewise, one of the two sleeves 128 or 146 on the input shaft 18 is conserving lube oil flow because the associated sleeve for the selected direction clutch is the only one occupying unblocking position.

While the engaged clutch in the direction clutch set on the shaft 18 and the engaged clutch in the load set on shaft 20 are in engaged position or are being disengaged, lube flow is still being conserved by the associated sleeves respectively for the other two clutches in the load set and for the other clutch in the direction set.

Finally, flow is conserved by all five sleeves 128, 146, 148, 148i, and 148h when all clutches are in the disengaged position due to the transmission disclosed being in neutral. The same principles equally apply to other transmissions in which all of the friction engaging devices or less than all are oil cooled fluid pressure operated brakes, such as commonly employed in transmissions including power shift planetary transmissions.

Variations within the spirit and scope of the invention described are equally comprehended by the foregoing description.

What is claimed is:

1. Frictionally engageable, fluid cooled assembly for a power-shift transmission having:
    input and output members comprising a main shaft and supported gear means rotatably related therewith;
    primary reciprocal piston means shiftably related to the main shaft and having a fluid reaction plate at an adjacent side of the piston means;
    friction engaging means about the shaft associated with the non-adjacent side of the piston means and frictionally engaged during a shift of, and by, the piston means to establish a drive coupling the input and output members;
    first passage means (90) in the main shaft for transmitting clutch cooling flow;
    a separate, primary reciprocal lube sleeve means fitting on the main shaft generally inside the friction engaging means and intervening with respect to the first shaft passage means;
    at least one of the primary reciprocal piston means and separate sleeve means having a pressure movable area and having the other in the path of movement thereof, and abuttingly engaged thereby;
    second passage means communicatively connected with the
    friction engaging means; and
    groove means forming annular chamber means (164, 162) generally circumscribing the main shaft and divided by valving surfaces on cooperating valve parts which intervene with valve-open and valve-closed positions therein and which are formed at least in part by the separate sleeve means; the first and second passage means being each one separately in open communication with the annular chamber means and spaced apart by the latter, and physically separate, from the valve parts which, in said valve open position, form a valve transit primary flow path and define a valve opening which, on average, has a length at least about commensurate with the circumference of the main shaft.

2. Frictionally engageable, fluid cooled assembly for a power-shift transmission having:
    input and output members comprising a main shaft and supported gear means rotatably related therewith;
    primary reciprocal piston means shiftably related to the main shaft and having a fluid reaction plate at an adjacent side of the piston means;
    friction engaging means about the main shaft associated with the non-adjacent side of the piston means and frictionally engaged during a shift of, and by, the piston means to establish a drive coupling the input and output members;
    first passage means (90) in the main shaft for transmitting clutch cooling flow, including a passage outlet port;
    a separate, primary reciprocal lube sleeve means fitting on the main shaft generally inside the friction engaging means and intervening with respect to the first passage means; there being an annular chamber about the main shaft, valving controlled by valve parts in the annular chamber outlet which are formed in part by the lube sleeve means; said annular chamber being in open communication with the first passage means outlet port;

at least one of the primary reciprocal piston means and separate sleeve means having a pressure movable area and having the other in the path of movement thereof, and abuttingly engaged thereby; and second passage means communicatively connected with the friction engaging means, said primary reciprocal sleeve means opening and closing the second passage means from the annular chamber, and affecting cooling flow for the friction engaging means;

said valve parts constructed, sized, and arranged whereby, incident to said abutting engagement by and between the primary reciprocal piston means and separate lube sleeve means and their predetermined initial conjoint shift attendant with friction engagement, and with respect to the annular chamber, the valve parts take a valve-open position freeing the annular chamber at the outlet so as to distribute its discharge circumferentially, with its mouth forming a valve transit primary flow path and defining a valve opening (164) which, on average, has a length at least about commensurate with the circumference of the main shaft.

3. Frictionally engageable, fluid cooled assembly for a multispeed transmission having:

input and output members comprising a supporting shaft and supported gear means rotatably related therewith;

primary reciprocal piston means shiftably related to the shaft and having a fluid reaction plate at an adjacent side of the piston means;

friction engaging means about the shaft associated with the non-adjacent side of the piston means and frictionally engaged during a shift of, and by, the piston means to establish a drive coupling the input and output members;

first passage means in the shaft for transmitting clutch cooling flow, including a primary, radially facing circumferential groove; and primary reciprocal lube sleeve means closely fitting on the shaft generally inside the friction engaging means, said primary reciprocal lube sleeve means formed with second passage means (140) communicatively connected with the engaging means and including a secondary radially inwardly facing circumferential groove effective to uncover the primary groove beneath the sleeve means by overlapping axially therewith;

at least one of the primary reciprocal piston means and sleeve means having a pressure movable area and having the other in the path of movement thereof, and abuttingly engaged thereby;

said sleeve means being a separate, replaceable part from, and constructed and arranged with respect to, the piston means so as to be capable of limitedly laterally sliding relative thereto where they abut such that, upon predetermined initial conjoint shift causing friction engagement and a freely partaken, consequent uncovering movement by one groove of the other, the valve transit primary flow path so opened into the second passage means is an exposed annular area with a circumferential length coextensive with that of both grooves.

4. Frictionally engageable, fluid cooled assembly for a multispeed transmission having:

input and output members comprising a supporting shaft and supported gear means rotatably related therewith;

primary reciprocal pistons shiftably and selectively actuably related to the shaft and having a unitary fluid reaction plate common to the primary reciprocal pistons at their adjacent sides;

friction engaging means about the shaft which are associated with the nonadjacent sides of the respective primary reciprocal pistons and which are frictionally engaged during a shift of, and by, the selected piston to establish a drive coupling the input and output members selectively;

first passage means in the shaft for transmitting clutch cooling flow, each including a primary, radially facing circumferential groove; and separate, primary reciprocal, unsealed lube sleeves each closely fitting on the shaft generally inside a different one of said respective friction engaging means, said separate primary reciprocal sleeves formed with second passage means communicatively connected with the engaging means and including secondary radially inwardly facing circumferential grooves effective to uncover the primary grooves beneath the sleeve by overlapping axially therewith;

each separate, primary reciprocal sleeve being in the path of shift of a different one of the selectively actuable, primary reciprocal pistons and capable of limitedly laterally sliding relative thereto such that, upon predetermined initial shift of the selected primary reciprocal piston for causing friction engagement and a freely partaken, consequent uncovering movement by one groove of the other, the valve transit primary flow path so opened into the second passage means is an exposed annular area with a circumferential length coextensive with that of both grooves.

5. The invention of claim 4, characterized by:

third passage means formed in the secondary reciprocal sleeves for communicating secondary cooling flow from the first passage means to the friction engaging means independently of said primary flow.

6. Frictionally engageable assembly for a transmission having:

input and output members comprising a shaft and supported gear means rotatably related therewith;

radially outer, pressure applying primary pistons shiftably related to the shaft and having a unitary fluid reaction plate (82) common to the pistons at their adjacent sides;

friction engaging means which are associated with the non-adjacent sides of the respective pistons and which are frictionally engaged during a shift to establish a drive coupling the input and output members;

passage means in the shaft for transmitting low pressure cooling flow that is led to radially inner edges of the friction engaging means; and secondary pistons oil pressure actuated at a relatively high pressure, and located on said shaft inside of the outer pistons and slideable relative to said outer pistons, said secondary pistons having controlling connections to the passage means for increasing opening of same during movement under direct force of the high pressure, and having connections to the respective outer pistons so as to supplement engaging force of the outer pistons;

said outer and secondary pistons controlled by spring means, and by varying a volume of pressure fluid which is under the high pressure and which is between the fluid reaction plate and pistons;

the controlling connections of each secondary piston comprising sleeve means on the shaft fully covering said shaft passage means, said sleeve means formed with restrictive secondary metering port means in the sleeve means to direct low cooling flow from the passage means in unshifted piston position, and formed with plural primary metering port means in the sleeve means to direct increased cooling flow from the passage means in a shifted piston position.

7. The invention of claim 6, wherein:

a large diameter shoulder on the common fluid reaction plate, (82) and a complementary large diameter reentrant angled portion of one (150) of the outer pistons forming a cooperating piston and cylinder which are pressure operable by the pressure fluid;

a small diameter shoulder on the common fluid reaction plate and a complementary small diameter reentrant angled portion of the other outer piston (clutch 3 piston) forming a cooperating piston and cylinder which are pressure operable by the pressure fluid;

the difference in shoulder diameters of the common unitary fluid reaction plate enabling the pressure fluid to exert in one piston and cylinder a larger force compared to the other.

8. The invention of claim 7, wherein the outer pistons share:

with the respective secondary pistons, seal means therebetween, and with the respective common unitary fluid reaction plate shoulders, seal means therebetween.

9. Frictionally engageable, fluid cooled assembly for a transmission drive having:

input and output members comprising a supporting shaft and supported gear means rotatably related therewith;

primary reciprocal piston means shiftably and hydraulically actuably related to the shaft and having a fluid reaction plate at an adjacent side of the piston means;

friction engaging means about the shaft associated with the non-adjacent side of the piston means and frictionally engageable thereby during a shift to establish a drive coupling the input and output members;

first passage means in the shaft for transmitting clutch cooling flow;

primary reciprocal lube sleeve means fitting on the shaft generally inside the friction engaging means and intervening with respect to the first passage means; there being annular chamber means (126) about said shaft in open communication with the first passage means;

at least one of the primary reciprocal piston means and sleeve means having a pressure movable area and having the other connected for movement therewith for conjoint shift attendant with friction engagement; and second passage means communicatively connected with the friction engaging means, said primary reciprocal sleeve means opening and closing the second passage means from, and by control of a valve part in the outlet of, the annular chamber means, thereby affecting cooling flow for the friction engaging means;

said valve part constructed, sized, and arranged whereby, incident to predetermined initial conjoint shift attendant with said friction engagement, and with respect to the annular chamber means, the valve part takes a valve-open position freeing the annular chamber means at the outlet so as to distribute its discharge circumferentially, with its mouth forming a valve transit primary flow path and defining a valve opening (142) which, on average, has a length at least about commensurate with the circumference of said shaft.

* * * * *